United States Patent
Kondo et al.

(10) Patent No.: US 10,774,209 B2
(45) Date of Patent: Sep. 15, 2020

(54) RESIN COMPOSITION

(71) Applicant: ASAHI KASEI KABUSHIKI KAISHA, Chiyoda-ku, Tokyo (JP)

(72) Inventors: Tomohiro Kondo, Tokyo (JP); Kenji Utashima, Tokyo (JP); Norihiko Furuya, Tokyo (JP)

(73) Assignee: ASAHI KASEI KABUSHIKI KAISHA, Chiyoda-ku, Tokyo (JP)

( * ) Notice: Subject to any disclaimer, the term of this patent is extended or adjusted under 35 U.S.C. 154(b) by 0 days.

(21) Appl. No.: 16/234,922

(22) Filed: Dec. 28, 2018

(65) Prior Publication Data
US 2019/0203028 A1 Jul. 4, 2019

(30) Foreign Application Priority Data
Dec. 28, 2017 (JP) .................. 2017-253922

(51) Int. Cl.
*C08L 29/14* (2006.01)
*C08K 13/06* (2006.01)

(52) U.S. Cl.
CPC .............. *C08L 29/14* (2013.01); *C08K 13/06* (2013.01); *C08L 2310/00* (2013.01)

(58) Field of Classification Search
CPC ................................ C08L 29/14; C08K 13/06
USPC ......................................... 523/171; 524/441
See application file for complete search history.

(56) References Cited

U.S. PATENT DOCUMENTS

| 7,019,048 B2 * | 3/2006 | Brehm ..................... C08K 7/16 523/171 |
| 2010/0261817 A1 | 10/2010 | Asai et al. |
| 2010/0280156 A1 | 11/2010 | Hase |

FOREIGN PATENT DOCUMENTS

| JP | S61159453 A | 7/1986 |
| JP | S6220574 A | 1/1987 |
| JP | 2009120705 A | 6/2009 |
| JP | 2009155418 A | 7/2009 |
| JP | 2010065210 A | 3/2010 |
| JP | 2012092185 A | 5/2012 |
| JP | 2015074711 A | 4/2015 |
| WO | 2013049541 A1 | 4/2013 |

* cited by examiner

*Primary Examiner* — Edward J Cain
(74) *Attorney, Agent, or Firm* — Kenja IP Law PC

(57) ABSTRACT

To provide a resin composition which can allow for production of a molded product causing less generation of formaldehyde and having an excellent metallic appearance, and furthermore which can allow for suppression of contamination in a mold and a molding machine during molding. A resin composition containing a polyacetal resin (A), an aluminum pigment (B), and a pearl-based pigment (C), in which the aluminum pigment (B) includes an aluminum particle, and the aluminum particle has a volume average particle size ($D_{50}$) of 3 to 100 μm and the content thereof is 0.01 to 15 parts by mass per 100 parts by mass of the polyacetal resin (A).

17 Claims, 1 Drawing Sheet

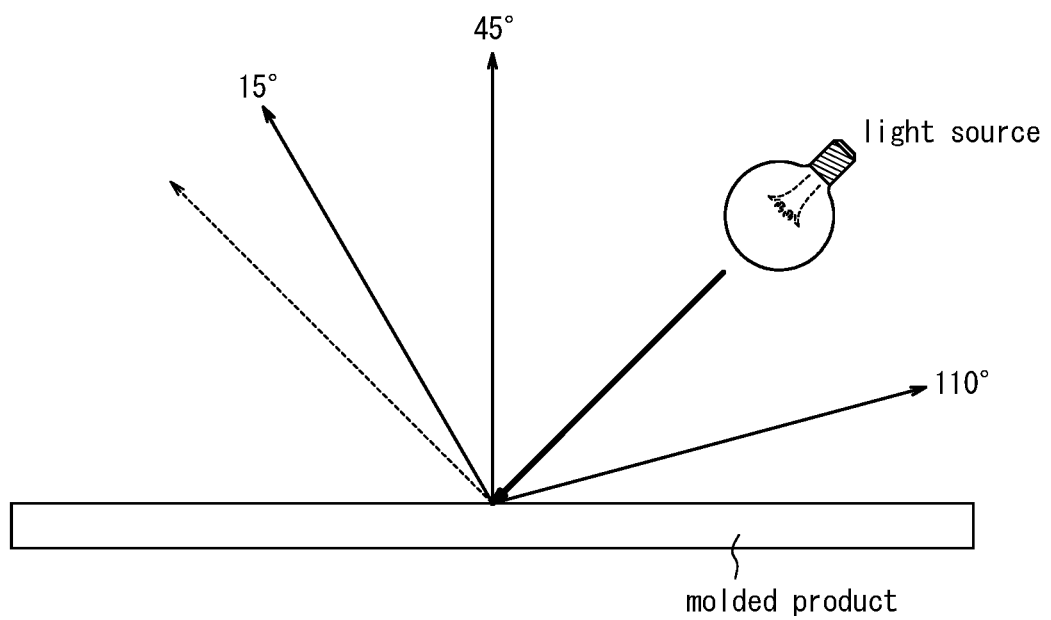

RESIN COMPOSITION

TECHNICAL FIELD

The present disclosure relates to a resin composition.

BACKGROUND

Crystalline resins in which crystals with regularly arranged molecular chains are present have many useful characteristics such as high mechanical strength and rigidity, and excellent chemical resistance. Such crystalline resins are easily processed, and therefore have been conventionally widely used mainly for mechanism components and sliding components in precision equipment, home electronics, OA equipment, automobiles, industrial materials, miscellaneous goods, and the like.

Metallic color pigments made of metal particles, typified by scale-like aluminum powders (hereinafter, also referred to as "aluminum flake"), are compounded in various resins in order to impart a characteristic metallic gloss feeling called a metallic tone. Resin compositions to which such metallic color pigments are compounded are used for interior and exterior components for automobiles, personal computer casings, and the like.

Examples of such resin compositions which are known include the following resin compositions described in PTLs below, and for example, there have been made attempts to impart any design by molding of a resin having a glossy pigment for exhibition of metallic gloss properties. Specifically, JP1987020574A (PTL 1) and JP1986159453A (PTL 2) each have disclosed a molded article formed from a synthetic resin composition to which a specified metallic pigment is compounded. JP2010065210A (PTL 3) has proposed a polyacetal resin composition including a weathering agent, an aluminum particle having specified particle size, particle size distribution and particle thickness, and a specified fatty acid, and has described the composition being excellent in production stability, mechanical properties, molding appearance, weld performance, and lightness. JP2009155418A (PTL 4) has proposed a polyacetal resin composition including a polyacetal resin, a metallic pigment, and a specified liquid additive, and has described the composition not only being excellent in extrusion properties, and retention stability and appearance properties in molding, but also being reduced in the content of an organic solvent and imparting a metallic appearance. WO2013/49541 (PTL 5) has disclosed a polymer composition including a polyacetal resin, a metal pigment, and an ultraviolet stabilizer, in which the metal pigment and the ultraviolet stabilizer are dispersed in sufficient amounts for imparting certain or higher glossiness to an outer surface of a molded product to be obtained.

CITATION LIST

Patent Literatures

PTL 1: JP1987020574A
PTL 2: JP1986159453A
PTL 3: JP2010065210A
PTL 4: JP2009155418A
PTL 5: WO2013/49541

SUMMARY

When, however, the techniques described in PTL 1 and PTL 2 are applied to a polyacetal resin, there is any influence by generation of heat in melting and mixing and/or by an active site on a metal surface, and therefore any sufficient effects are not obtained on suppression of the amount of formaldehyde generated and improvements in appearances such as gloss of a product.

The technique described in PTL 3 has not been studied about the influence on the amount of formaldehyde generated, the influence on appearances such as gloss of a product, and the like.

PTL 4 has proposed a technique for the purposes of imparting heat stability of a molded article and suppressing formaldehyde, but a metallic pigment in which an aluminum powder is dispersed in polyethylene is merely provided, and neither there have been made any studies about the influence on appearances such as glossiness and brightness of a molded article obtained, nor there have been obtained any sufficient effects about such appearances.

PTL 5 has not mentioned any influence on glossiness and the like by other additives at all. Moreover, the technique disclosed in PTL 5, if a large amount of an aluminum pigment is used, is liable to cause dropping of the aluminum pigment, attachment of the aluminum pigment to a mold for molding (mold deposit), and contamination in a molding machine during molding, and has the potential problem of attachment of the aluminum pigment to hands even due to only a touch to a pellet made of the polymer composition.

The present disclosure has been devised in view of such conventional circumstances, and an object thereof is to provide a resin composition which can allow for production of a molded product causing less generation of formaldehyde and having an excellent metallic appearance, and furthermore which can allow for suppression of contamination in a mold and a molding machine during molding.

The present disclosers have made intensive studies, and as a result, have found that a resin composition which causes less generation of formaldehyde and which has an excellent metallic appearance, and furthermore which can allow for suppression of contamination in a mold and a molding machine during molding is obtained by adding specified aluminum pigment and pearl-based pigment to a polyacetal resin, thereby leading to completion of the present disclosure.

That is, the present disclosure is as follows.

[1]
A resin composition containing a polyacetal resin (A), an aluminum pigment (B), and a pearl-based pigment (C), wherein
the aluminum pigment (B) includes an aluminum particle and another component, and
the aluminum particle has a volume average particle size ($D_{50}$) of 3 to 100 μm and a content thereof is 0.01 to 15 parts by mass per 100 parts by mass of the polyacetal resin (A).

[2]
The resin composition according to [1], containing the aluminum pigment (B) in an amount of more than 1 part by mass and 15 parts by mass or less per 100 parts by mass of the polyacetal resin (A).

[3]
The resin composition according to [1] or [2], containing the pearl-based pigment (C) in an amount of 0.01 to 10 parts by mass per 100 parts by mass of the polyacetal resin (A).

[4]
The resin composition according to any one of [1] to [3], wherein the pearl-based pigment (C) has a volume average particle size ($D_{50}$) of 1 to 300 μm.

[5]

The resin composition according to any one of [1] to [4], wherein the pearl-based pigment (C) includes 40% by mass or more of a synthetic mineral.

[6]

The resin composition according to any one of [1] to [5], wherein the pearl-based pigment (C) is mica covered with titanium dioxide or iron oxide.

[7]

The resin composition according to any one of [1] to [6], wherein the aluminum pigment (B) includes the aluminum particle and a binder (D), and a mass ratio (binder (D)/aluminum particle) of the binder (D) to the aluminum particle is within the range of 5/95 to 30/70.

[8]

The resin composition according to any one of [1] to [7], wherein the binder (D) is at least one selected from liquid paraffin and polyalkylene glycol.

According to the present disclosure, there can be provided a resin composition which causes less generation of formaldehyde and which can allow for production of a molded product having an excellent metallic appearance, and furthermore which can allow for suppression of contamination in a mold and a molding machine during molding.

BRIEF DESCRIPTION OF THE DRAWING

In the accompanying drawing:

FIG. 1 is a schematic view describing a method for evaluating an FI value in Examples.

DETAILED DESCRIPTION

Hereinafter, an embodiment for carrying out the present disclosure (hereinafter, designated as "the present embodiment") will be described in detail. The present disclosure is not intended to be limited to the following description, and can be variously modified and carried out within the scope thereof.

A resin composition of the present embodiment contains a polyacetal resin (A), an aluminum pigment (B), and a pearl-based pigment (C), in which the aluminum pigment (B) includes an aluminum particle and another component, and the aluminum particle has a volume average particle size ($D_{50}$) of 3 to 100 μm and the content thereof is 0.01 to 15 parts by mass per 100 parts by mass of the polyacetal resin (A). The resin composition of the present embodiment can appropriately contain, if necessary, a formaldehyde inhibitor (E) and other additive.

(Polyacetal Resin (A))

The polyacetal resin (A) is not particularly limited, and a conventionally known polyacetal can be used. The polyacetal resin (A) can be used singly or in combinations of a plurality thereof.

Examples of the polyacetal resin (A) include a polyoxymethylene homopolymer substantially made of an oxymethylene unit —($CH_2O$)—, obtained by homopolymerization of a cyclic oligomer of formaldehyde, trioxane, tetraoxane or the like, or a polyoxymethylene copolymer having a structure where an oxyalkylene unit represented by the following general formula (1) is randomly inserted into a continuous chain made of an oxymethylene unit —($CH_2O$)—, obtained by copolymerization of formaldehyde and/or trioxane with a cyclic ether and/or a cyclic formal, or a cyclic formal to which a hindered phenol-based antioxidant is added in an amount of 1 ppm by mass or more and 500 ppm by mass or less.

[Formula 1]

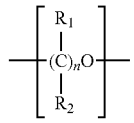

(1)

In the formula, $R_1$ and $R_2$ each represent a hydrogen atom, an alkyl group, or an aryl group, and may be the same as or different from each other, and n is an integer of 2 to 6.

The polyoxymethylene copolymer used in the present embodiment also encompasses a branched polyoxymethylene copolymer in which a molecular chain is branched, and a polyoxymethylene block copolymer having a heterogeneous block in which the repeating unit of oxymethylene occupies 50% by mass or more.

The insertion rate of the oxyalkylene unit in the polyoxymethylene copolymer is preferably 0.01 mol or more and 50 mol or less, and more preferably in the range of 0.03 mol or more and 20 mol or less, per 100 mol of the oxymethylene unit. Examples of the oxyalkylene unit include an oxyethylene unit, an oxypropylene unit, an oxytetramethylene unit, an oxybutylene unit, and an oxyphenylethylene unit. Among such oxyalkylene units, an oxypropylene unit —$[(CH_2)_3O]$— and an oxytetramethylene unit —$[(CH_2)_4O]$— are preferable from the viewpoint of enhancing physical properties of the resin composition.

The polyacetal resin obtained by homopolymerization or copolymerization is desirably subjected to a terminal stabilization treatment. The terminal stabilization treatment method here used is, for example, a method including esterification, etherification, urethanization, or the like of a hydroxyl group at a terminal, or a method including stabilization of an unstable moiety at a terminal by hydrolysis.

The polyacetal resin subjected to a terminal stabilization treatment is obtained by, for example, continuous feeding to a counter-rotating non-intermeshing twin screw extruder where a step of subjecting a molecular terminal of a polyoxymethylene copolymer obtained by copolymerization of formaldehyde and/or trioxane with a cyclic ether and/or a cyclic formal, to a stabilization treatment immediately after the polymerization, thereafter a step of pouring water or an alcohol, or a mixture thereof and kneading the resultant in a molten state, and a devolatilization step of releasing vapor of a hydroxyl group-containing compound, for example, the water, and free formaldehyde can be performed. When the water, alcohol or mixture thereof is poured and the resultant is kneaded, a basic substance such as triethylamine is preferably added as a pH adjuster.

The MFR of the polyacetal resin (melt flow rate; according to ASTM D57E, temperature condition: 190° C.) is preferably 2.5 to 40 g/10 minutes, more preferably 3 to 30 g/10 minutes. When the MFR of the polyacetal resin is adjusted in the above range, the resin composition achieves mechanical properties, and heat stability and the amount of formaldehyde generated in retention molding, in a well-balanced manner.

(Aluminum Pigment (B))

The resin composition of the present embodiment contains an aluminum pigment (B). The aluminum pigment (B) includes at least an aluminum particle, and can further include another component such as a binder (D) described below. The aluminum pigment (B) can an aluminum particle having a flat shape such as a coin- or flake-like shape, resulting in exhibition of more favorable metallic gloss.

Herein, the aluminum pigment (B) can include any component other than the aluminum particle, and therefore the amount of the aluminum pigment actually used can be larger than the amount of aluminum required.

The content of the aluminum pigment (B) in the resin composition of the present embodiment is not particularly limited, and the content is preferably more than 1 part by mass and 15 parts by mass or less per 100 parts by mass of the polyacetal resin (A). When the content of the aluminum pigment (B) is adjusted in the above range, a molded article produced from the resin composition of the present embodiment not only can more favorably keep mechanical properties originally possessed in the polyacetal resin (A), such as rigidity and impact resistance, and can be effectively inhibited in generation of formaldehyde, but also can exhibit more favorable metallic gloss.

—Aluminum Particle—

The aluminum particle preferably has a proper oxide film on the surface thereof. When the aluminum particle has a proper oxide film, a high reflectance unique to aluminum can be maintained, and the aluminum particle can keep corrosion resistance, and stability over time. The purity of the aluminum particle is not particularly limited, and the aluminum particle may contain other metal as impurities or an alloy component as long as the effect of the present disclosure is not impaired. Examples of such impurities or an alloy component include Si, Fe, Cu, Mn, Mg, and Zn.

The content of the aluminum particle in the resin composition of the present embodiment is 0.01 to 15 parts by mass per 100 parts by mass of the polyacetal resin (A). The content of the aluminum particle in the resin composition of the present embodiment is preferably 0.1 to 15 parts by mass, more preferably 1 to 10 parts by mass, further preferably 1.5 to 7 parts by mass, still further preferably 2 to 6 parts by mass from the viewpoint of decreases in the weights of the composition and a molded product obtained by using the composition. When the content of the aluminum particle is adjusted in the above range, a molded article produced from the resin composition of the present embodiment not only can more favorably keep mechanical properties originally possessed in the polyacetal resin (A), such as rigidity and impact resistance, and can be effectively inhibited in generation of formaldehyde, but also can exhibit more favorable metallic gloss.

The content of the aluminum particle in the resin composition of the present embodiment is preferably 4 to 10 parts by mass, more preferably 5 to 10 parts by mass per 100 parts by mass of the polyacetal resin (A) from the viewpoint of a more enhancement in metallic appearance. In general, when a large amount of an aluminum particle is thus included, a mold deposit due to attachment of the particle to a mold tends to be often generated. In the present embodiment, however, the aluminum particle can be used in combination with a pearl-based pigment (C) described below, thereby resulting in suppression of a mold deposit.

The volume average particle size ($D_{50}$) of the aluminum particle is 3 to 100 µm. The volume average particle size ($D_{50}$) of the aluminum particle is preferably 3 to 60 µm, more preferably 3 to 40 µm, further preferably 5 to 30 µm from the viewpoint of an enhancement in reflectance.

The volume average particle size ($D_{50}$) can be measured by a method described in Examples below.

The average particle thickness of the aluminum particle is preferably 0.01 to 1.0 µm, more preferably 0.02 to 0.6 µm, further preferably 0.03 to 0.4 µm from the viewpoint of brightness. The average particle thickness (t) of the aluminum particle can be calculated from the following method.

1) Method of Calculating Average Particle Thickness from Water Surface Diffusion Area (WCA)

First, the aluminum particle is subjected to a preliminary treatment with a mineral spirit solution of 5% stearic acid, and thereafter the water surface diffusion area (WCA) of aluminum is measured according to JIS K5906-1991. Next, the average particle thickness can be calculated using the water surface diffusion area (WCA) per gram of aluminum ($m^2/g$) according to the following expression.

$$t=0.4/WCA$$

The above method of calculating the average particle thickness is described in, for example, Aluminium Paint and Powder, edited by J. D. Edwards & R. I. Wray, vol. 3, Reinhold Publishing Corp. New York (1955), pages 16 to 22. In the expression, the numerical value "0.4" corresponds to the reciprocal number of a density of aluminum of 2.7 $g/cm^3$ (1/2.7=about 0.4).

While the method of measuring the water surface diffusion area described in JIS corresponds to a method in the case of leafing, the method with respect to aluminum corresponds to a method in the case of non-leafing. The method of measuring the water surface diffusion area (WCA) of aluminum can be performed in the same manner as in the method in the case of leafing described in JIS K5906-1991 except that a measurement sample is subjected to a preliminary treatment with a mineral spirit solution of 5% stearic acid. The preliminary treatment of the sample is described in "Review on the Raw Materials for Paints", No. 156, pages 2 to 16 (published by manufactured by Asahi Kasei Corporation on Sep. 1, 1980).

2) Method of Calculating Average Particle Thickness from Observation Result of Scanning Electron Microscope (SEM)

When calculation cannot be made according to the method 1) (for example, when the WCA cannot be measured), the average particle thickness can also be determined by a method including observing the aluminum particle by a scanning electron microscope (SEM) to calculate the average value of a plurality of results, for example, the thickness values of the aluminum particle observed at 100 positions.

An aluminum particle having a volume average particle size and an average particle thickness in the above ranges can be used to thereby allow for not only suppression of breakage of the aluminum particle during extruding or the like, but also enhancements in appearance properties of a molded article produced from the resin composition of the present embodiment, and expression of more favorable metallic gloss.

The aluminum particle can be prepared by a known method. For example, the aluminum particle is obtained by preliminarily sorting an atomized powder, a cut powder, a foil powder, a deposited powder, or an aluminum powder obtained by other method, by primary classification or the like, thereafter performing a wet pulverization treatment by a ball mill, an attritor, a planetary mill, a vibrating mill or the like under coexistence of a pulverization medium including a pulverization aid, a solvent, and the like, performing sieve classification in a wet state, and performing liquid-solid separation by a filter press or the like. Thus, an aluminum particle can be produced which less has an uneven fracture surface present at an end of a flake.

The shape of the aluminum particle is preferably a flat shape such as a coin- or flake-like shape, as described above.

The flat shape here mentioned refers to a shape having an average shape ratio [average particle thickness (t)/volume average particle size ($D_{50}$)] of 0.2 or less, preferably a shape having an average shape ratio of 0.1 or less, more preferably 0.05 or less. When the average shape ratio is in the range, the surface area of a portion having a high reflectance unique to a metal can be increased by addition of a small amount of the aluminum particle. Therefore, when the average shape ratio is in the range, the brightness of a molded article can be efficiently increased by a small amount of the aluminum particle added.

—Binder (D)—

The aluminum pigment (B) preferably includes a binder (D), in addition to the aluminum particle. The binder (D) is here used for the purpose of mixing with the aluminum particle in a uniform state, and the aluminum pigment (B) can include the binder (D), thereby allowing the aluminum pigment (B) to be uniformly dispersed in the resin composition, and allowing the aluminum pigment (B) to be effectively inhibited from being dropped in a molding machine. The aluminum pigment (B) can include the binder (D), thereby allowing higher glossiness and FI value described below to be obtained. The binder (D) can be used singly or in combinations of a plurality thereof.

Examples of the binder (D) include a hydrocarbon-based binder (including an oligomer/polymer having a hydrocarbon backbone), a higher fatty acid-based binder, a higher alcohol-based binder, an aliphatic amide-based binder, a metal soap-based binder, a homopolymer or copolymer of alkylene glycol (for example, $C_{3-6}$ alkylene glycol), an esterified derivative of polyalkylene glycol, and other modified product of polyalkylene glycol.

Examples of the hydrocarbon-based binder include liquid paraffin and mineral spirit.

Examples of the homopolymer include polyalkylene glycols such as polypropylene glycol, polytetramethylene ether glycol, polypentamethylene ether glycol, and polyneopentylene ether glycol.

Examples of the copolymer include a polyethylene polytetramethylene ether copolymer, a polypropylene polytetramethylene ether copolymer, a polyethylene polypentamethylene ether copolymer, a polypropylene polypentamethylene ether copolymer, a polyethylene polyneopentylene ether copolymer, a polypropylene polyneopentylene ether copolymer, and a THF-neopentyl glycol copolymer.

Examples of the esterified derivative of polyalkylene glycol include polytetramethylene glycol monostearate, polytetramethylene glycol distearate, polypentamethylene glycol monostearate, polypentamethylene glycol distearate, polyneopentylene ether glycol monostearate, and polyneopentylene ether glycol distearate.

Among them, the binder (D) is preferably a hydrocarbon-based binder, polyalkylene glycol, polytetramethylene ether glycol, and a THF-neopentyl glycol copolymer from the viewpoint of availability, prevention of dropping of the aluminum pigment in a molding machine, and a further enhancement in glossiness, and is preferably at least one selected from liquid paraffin and polyalkylene glycol.

The content of the binder (D) in the resin composition of the present embodiment is not particularly limited as long as extrusion and injection molding are not impaired, and the mass ratio (binder (D)/aluminum particle) of the binder (D) to the aluminum particle is preferably within the range of 5/95 to 30/70. When the mass ratio is 5/95 or more, the possibility of dropping into a molding machine can be more reduced. When the mass ratio is 30/70 or less, not only dropping into a molding machine can be suppressed by a bare minimum amount of the binder, but also the running state of an extruder and metering of the resin in injection molding can be stable (for example, the occurrence of vent-up in extruding is suppressed). The mass ratio is within the range of preferably 8/92 to 25/75, more preferably 10/90 to 20/80, further preferably 10/90 to 15/85 from the same viewpoint.

(Pearl-Based Pigment (C))

The resin composition of the present embodiment contains a pearl-based pigment (C). The pearl-based pigment (C) here means a pigment contributing to adjustment of a color tone and having pearl gloss. Examples of the pearl-based pigment (C) include a particle including a metal oxide on a surface portion thereof. Examples of such a pearl-based pigment include a pigment in which the surface of a scale-like particle of mica or the like is covered with a metal oxide. The metal oxide contained in the pearl-based pigment (C) is not particularly limited as long as it does not have any effects on metallic properties of the resin composition of the present embodiment, and examples thereof include oxides of metals such as titanium, iron, zirconium, silicon, aluminum, and cerium. The metal oxide can be used singly or in combinations of a plurality thereof. Specific examples of the pearl-based pigment (C) include mica covered with titanium dioxide, mica covered with iron oxide, mica covered with titanium dioxide and iron oxide, a glass flake covered with titanium oxide, and talc covered with titanium oxide. Among them, the pearl-based pigment (C) is preferably mica covered with titanium dioxide or iron oxide.

It is noted that the pearl-based pigment (C) is not encompassed in the aluminum pigment (B).

The content of the pearl-based pigment (C) in the resin composition of the present embodiment is not particularly limited, the content is preferably 0.01 to 10 parts by mass per 100 parts by mass of the polyacetal resin from the viewpoint that contamination of a mold due to the aluminum pigment is efficiently prevented. The content of the pearl-based pigment (C) in the resin composition of the present embodiment is preferably 0.05 to 7 parts by mass, more preferably 0.08 to 5 parts by mass, further preferably 0.1 to 6 parts by mass from the same viewpoint.

The volume average particle size ($D_{50}$) of the pearl-based pigment (C) is preferably 1 to 300 μm. The volume average particle size ($D_{50}$) of the pearl-based pigment (C) is more preferably 2 to 200 μm, further preferably 3 to 150 μm from the viewpoint of increases in the reflectance and the FI value.

The Fe concentration in the pearl-based pigment (C) is preferably 10% by mass or less, more preferably 6% by mass or less, further preferably 4% by mass or less from the viewpoint of suppression of generation of formaldehyde and from the viewpoint of an enhancement in brightness. The pearl-based pigment (C) to be used is preferably one synthesized by melting synthesis of a raw material, also in order to adjust the Fe concentration to a desired concentration.

The shape of the pearl-based pigment (C) is preferably a flat or scale-like shape, more preferably a scale-like shape. Thus, volatilization of formaldehyde from the resin can be efficiently suppressed. The thickness of the pearl pigment (C) is preferably 0.01 to 10 μm, more preferably 0.02 to 8 μm, further preferably 0.05 to 5 μm.

The pearl-based pigment (C) is preferably a synthetic mineral, in particular, a synthetic mineral obtained by melting synthesis of a raw material mineral. Examples of a preferable raw material of the pearl-based pigment include mica, talc, and a glass flake. In general, melting synthesis is conducted by melting a raw material mineral with heating to 1000° C. or more, and thereafter cooling it for recrystallization. For example, mica does not contain any transition metals unlike a natural source, and therefore provides a colorless and transparent, pure crystal as a synthetic mineral.

The particle size of the synthetic mineral obtained by melting synthesis can be freely adjusted. Specifically, for example, the particle size can also be adjusted by control of the cooling rate after melting, or can also be controlled by once synthesis of a coarse product and then pulverization thereof. For example, in the case of synthetic mica, the amount of a heavy metal incorporated can be controlled to 1 ppm or less, the concentration of Fe causing coloration can be controlled to 100 ppm or less, and, even when various metals are added for preparation of a colored pearl pigment (C), coloring can be stably made depending on the amount added.

The proportion of the synthetic mineral in the pearl-based pigment (C) is preferably 40% by mass or more, more preferably 60% by mass or more, further preferably 80% by mass or more from the viewpoint of free adjustment of the particle size and a reduction in the amount of a heavy metal incorporated.

While not bound to any theory, a proper amount of the pearl-based pigment (C) is placed to thereby impart favorable heat transfer in a mold during molding, or thereby cause no warpage of a composition including the pearl pigment (C) and the aluminum pigment (B) mixed, in a mold during cooling, and no occurrence of any fine gap not visible, between the mold and the composition. Therefore, dropping of aluminum from the resin composition not sufficiently cooled is decreased, thereby resulting in a decrease in attachment of the aluminum pigment (B) onto the surface of the mold.

(Formaldehyde Inhibitor (E))

The resin composition of the present embodiment preferably contains, if necessary, a formaldehyde inhibitor (E) as long as the object of the present disclosure is not impaired. Examples of the formaldehyde inhibitor (E) include an aminotriazine-based compound, a guanamine-based compound, a urea-based compound, and a carboxylic acid hydrazide-based compound. The formaldehyde inhibitor can be used singly or in combinations of a plurality thereof.

Examples of the aminotriazine-based compound include melamine; melamine condensates such as melam, melem, and melon; melamine resins such as a melamine formaldehyde resin; and N-hydroxyarylalkylmelamine-based compounds such as N,N',N''-mono, bis, tris, tetrakis, pentakis, or hexakis(o-, m- or p-hydroxyphenylmethyl)melamine.

Examples of the guanamine-based compound include aliphatic guanamine-based compounds such as valeroguanamine, caproguanamine, heptanoguanamine, capryloguanamine, and stearoguanamine; alkylene bisguanamines such as succinoguanamine, glutaroguanamine, adipoguanamine, pimeloguanamine, suberoguanamine, azeloguanamine, and sebacoguanamine; alicyclic guanamine-based compounds such as cyclohexane carboguanamine, norbornene carboguanamine, cyclohexene carboguanamine, norbornane carboguanamine, and functional group-substituted derivatives thereof; aromatic guanamine-based compounds such as benzoguanamine, α- or β-naphthoguanamine, and functional group-substituted derivatives thereof; polyguanamines such as phthaloguanamine, isophthaloguanamine, terephthaloguanamine, naphthalene diguanamine, and biphenylene diguanamine; aralkyl- or aralkyleneguanamines such as phenylacetoguanamine, β-phenylpropioguanamine, and o-, m-, or p-xylylenebisguanamine; and hetero atom-containing guanamine-based compounds such as acetal group-containing guanamines, dioxane ring-containing guanamines, tetraoxospiro ring-containing guanamines, and isocyanuric ring-containing guanamines.

Examples of the functional group-substituted derivatives with reference to the alicyclic guanamine-based compounds include derivatives where a cycloalkane residue is substituted with 1 to 3 functional groups such as an alkyl group, a hydroxy group, an amino group, an acetoamino group, a nitrile group, a carboxy group, an alkoxycarbonyl group, a carbamoyl group, an alkoxy group, a phenyl group, a cumyl group, and a hydroxyphenyl group.

Examples of the functional group-substituted derivatives with respect to the aromatic guanamine-based compounds include derivatives where a phenyl residue of benzoguanamine or a naphthyl residue of naphthoguanamine is substituted with 1 to 5 functional groups such as an alkyl group, a hydroxy group, an amino group, an acetoamino group, a nitrile group, a carboxy group, an alkoxycarbonyl group, a carbamoyl group, an alkoxy group, a phenyl group, a cumyl group, and a hydroxyphenyl group, and examples of such aromatic guanamine-based compounds include o-, m- or p-toluguanamine, o-, m- or p-xyloguanamine, o-, m- or p-phenylbenzoguanamine, o-, m- or p-hydroxybenzoguanamine, 4-(4'-hydroxyphenyl)benzoguanamine, o-, m- or p-nitrilebenzoguanamine, 3,5-dimethyl-4-hydroxybenzoguanamine, and 3,5-di-t-butyl-4-hydroxybenzoguanamine.

Examples of the acetal group-containing guanamines include 2,4-diamino-6-(3,3-dimethoxypropyl-s-triazine.

Examples of the dioxane ring-containing guanamines include [2-(4'-6'-diamino-s-triazin-2'-yl)ethyl]-1,3-dioxane and [2-(4'-6'-diamino-s-triazin-2'-yl)ethyl]-4-ethyl-4-hydroxymethyl-1,3-dioxane.

Examples of the tetraoxospiro ring-containing guanamines include CTU-guanamine and CMTU-guanamine.

Examples of the isocyanuric ring-containing guanamines include 1,3,5-tris[2-(4',6'-diamino-s-triazin-2'-yl)ethyl]isocyanurate and 1,3,5-tris[3-(4',6'-diamino-s-triazin-2'-yl)propyl]isocyanurate.

Examples of the urea-based compound include a linear urea-based compound and a cyclic urea-based compound.

Examples of the linear urea-based compound include condensates of urea and formaldehyde, such as biurea, biuret, and formnitrogen, and polyalkylene or arylene urea, such as polynonamethyleneurea.

Examples of the cyclic urea-based compound include hydantoins, crotylidene diurea, acetyleneurea, mono-, di-, tri- or tetraalkoxymethyl glycoluril such as mono-, di-, tri- or tetramethoxymethyl glycoluril, cyanuric acid, isocyanuric acid, uric acid, and urazole. Examples of the hydantoins include hydantoin, 5-methylhydantoin, 5-ethylhydantoin, 5-isopropylhydantoin, 5-phenylhydantoin, 5-benzylhydantoin, 5,5-dimethylhydantoin, 5,5-pentamethylenehydantoin, 5-methyl-5-phenylhydantoin, 5,5-diphenylhydantoin, 5-(o-, m- or p-hydroxyphenyl)hydantoin, 5-(o-, m- or p-aminophenyl)hydantoin, allantoin, 5-methylallantoin, and metal salts such as Al salts of allantoin, such as dihydroxyaluminum allantoin salts.

Examples of the carboxylic acid hydrazide-based compound include an aliphatic carboxylic acid hydrazide-based compound, an alicyclic carboxylic acid hydrazide-based compound, and an aromatic carboxylic acid hydrazide-based compound.

Examples of the aliphatic carboxylic acid hydrazide-based compound include monocarboxylic acid hydrazides such as lauric acid hydrazide, stearic acid hydrazide, 12-hydroxystearic acid hydrazide, and 1,2,3,4-butanetetracarboxylic acid hydrazide; and polycarboxylic acid hydrazides such as succinic mono- or dihydrazide, glutaric acid mono- or dihydrazide, adipic acid mono- or dihydrazide, pimelic acid mono- or dihydrazide, suberic acid mono- or dihydrazide, azelaic acid mono- or dihydrazide, sebacic acid mono- or dihydrazide, dodecanedioic acid mono- or dihydrazide, hexadecanedioic acid mono- or dihydrazide, eicosandioic acid mono- or dihydrazide, and 7,11-octadecadiene-1,18-dicarbohydrazide.

Examples of the alicyclic carboxylic acid hydrazide-based compound include monocarboxylic acid hydrazides such as cyclohexanecarboxylic acid hydrazide; and polycarboxylic acid hydrazides such as dimer acid mono- or dihydrazide, trimer acid mono-, di- or trihydrazide, 1,2-, 1,3- or 1,4-cyclohexanedicarboxylic acid mono- or dihydrazide, and cyclohexanetricarboxylic acid mono-, di- or trihydrazide.

Examples of the aromatic carboxylic acid hydrazide-based compound include monocarboxylic acid hydrazides such as benzoic acid hydrazide and functional group-substituted derivatives thereof, and α- or β-naphthoic acid hydrazide and functional group-substituted derivatives thereof; and polycarboxylic acid hydrazides such as isophthalic acid mono- or dihydrazide, terephthalic acid mono- or dihydrazide, 1,4- or 2,6-naphthalene dicarboxylic acid mono- or dihydrazide, 3,3'-, 3,4'- or 4,4'-diphenyldicarboxylic acid mono- or dihydrazide, diphenyletherdicarboxylic acid mono- or dihydrazide, diphenylmethanedicarboxylic acid mono- or dihydrazide, diphenylethanedicarboxylic acid mono- or dihydrazide, diphenoxyethanedicarboxylic acid mono- or dihydrazide, diphenylsulfonedicarboxylic acid mono- or dihydrazide, diphenyl ketone dicarboxylic acid mono- or dihydrazide, 4,4"-terphenyldicarboxylic acid mono- or dihydrazide, 4,4'''-quaterphenyldicarboxylic acid mono- or dihydrazide, 1,2,4-benzenetricarboxylic acid mono-, di- or trihydrazide, pyromellitic acid mono-, di-, tri- or tetrahydrazide, and 1,4,5,8-naphthoic acid mono-, di-, tri- or tetrahydrazide. Examples of the benzoic acid hydrazide and functional group-substituted derivatives thereof include derivatives such as o-, m- or p-methylbenzoic acid hydrazide, 2,4-, 3,4-, 3,5- or 2,5-dimethylbenzoic acid hydrazide, o-, m- or p-hydroxybenzoic acid hydrazide, o-, m- or p-acetoxybenzoic acid hydrazide, 4-hydroxy-3-phenylbenzoic acid hydrazide, 4-acetoxy-3-phenylbenzoic acid hydrazide, 4-phenylbenzoic acid hydrazide, 4-(4'-phenyl)benzoic acid hydrazide, 4-hydroxy-3,5-dimethylbenzoic acid hydrazide, and 4-hydroxy-3,5-di-t-butylbenzoic acid hydrazide, in which a phenyl residue of benzoguanamine is substituted with 1 to 5 functional groups such as an alkyl group, a hydroxy group, an acetoxy group, an amino group, an acetoamino group, a nitrile group, a carboxy group, an alkoxycarbonyl group, a carbamoyl group, an alkoxy group, a phenyl group, a benzyl group, a cumyl group, and a hydroxyphenyl group. Examples of the α- or β-naphthoic acid hydrazide and functional group-substituted derivatives thereof include 3-hydroxy-2-naphthoic acid hydrazide and 6-hydroxy-2-naphthoic acid hydrazide.

The above-mentioned formaldehyde inhibitors can also be used in the form of being carried on a layered substance or a porous substance (hydrotalcite, montmorillonite, silica gel, alumina, titania, zirconia, sepiolite, smectite, palygorskite, imogolite, zeolite, activated carbon, or the like).

The formaldehyde inhibitor (E) is, among them, preferably any of an aliphatic carboxylic acid hydrazide-based compound and an aromatic carboxylic acid hydrazide-based compound, more preferably an aliphatic carboxylic acid hydrazide-based compound.

The content of the formaldehyde inhibitor (E) in the resin composition of the present embodiment is preferably 0.01 to 5 parts by mass, more preferably 0.01 to 2 parts by mass, further preferably 0.02 to 1 part by mass per 100 parts by mass of the polyacetal resin (A). When the content of the formaldehyde inhibitor (E) is in the above range, not only a sufficient effect of suppression of formaldehyde is obtained, but also a mold deposit can be suppressed.

(Other Additive)

The resin composition of the present embodiment can contain other additive traditionally used. Such an additive is not particularly limited, and is preferably a stabilizer or the like used for a conventional polyacetal resin (A).

Examples of the stabilizer include an antioxidant and a weathering stabilizer, and also further include a scavenger of formic acid or formaldehyde. The resin composition of the present embodiment can contain, if necessary, any coloring agent as such an additive in order to enhance design.

The additive can be used singly or in combinations of a plurality thereof.

—Antioxidant—

The antioxidant is preferably a hindered phenol-based antioxidant, and examples thereof include n-octadecyl-3-(3'5'-di-t-butyl-4'-hydroxyphenyl)-propionate, n-octadecyl-3-(3'-methyl-5'-t-butyl-4'-hydroxyphenyl)-propionate, n-tetradecyl-3-(3'5'-di-t-butyl-4'-hydroxyphenyl)-propionate, 1,6-hexanediol-bis-(3-(3,5-di-t-butyl-4-hydroxyphenyl)-propionate), 1,4-butanediol-bis-(3-(3,5-di-t-butyl-4-hydroxyphenyl)-propionate), and triethylene glycol-bis-(3-(3-t-butyl-5-methyl-4-hydroxyphenyl)-propionate).

The content of the antioxidant in the resin composition of the present embodiment is preferably 0.01 to 2 parts by mass, more preferably 0.02 to 1 part by mass per 100 parts by mass of the polyacetal resin (A). When the content of the antioxidant is 0.01 to 2 parts by mass, the resin composition of the present embodiment is enhanced in heat stability during a molding process, and thus has favorable heat stability.

—Weathering Stabilizer—

Examples of the weathering stabilizer include a hindered amine-based stabilizer. Examples of the hindered amine-based stabilizer include a piperidine derivative having a sterically hindering group, and examples of such a derivative include an ester group-containing piperidine derivative, an ether group-containing piperidine derivative, an amide group-containing piperidine derivative, and a polycondensate of a piperidine derivative, having a high molecular weight.

The content of the hindered amine-based stabilizer in the resin composition of the present embodiment is preferably 0.01 to 5 parts by mass, more preferably 0.1 to 2 parts by mass, further preferably 0.1 to 1.5 parts by mass per 100 parts by mass of the polyacetal resin (A).

The resin composition of the present embodiment preferably further contains an ultraviolet absorber as the weathering stabilizer. Thus, a molded article obtained from the resin composition of the present embodiment achieves an enhancement effect of weather resistance (light stability). Examples of the ultraviolet absorber include a benzotriazole-based compound, a benzophenone-based compound, an oxalic anilide-based compound, and a hydroxyphenyl-1,3,5-triazine-based compound.

When the resin composition of the present embodiment contains the ultraviolet absorber and the hindered amine-based stabilizer, the mass ratio of the ultraviolet absorber to the hindered amine-based stabilizer is preferably a mass ratio of ultraviolet absorber/hindered amine-based stabilizer of 10/90 to 80/20, more preferably 10/90 to 70/30, further preferably 20/80 to 60/40.

—Scavenger of Formic Acid or Formaldehyde—

The resin composition of the present embodiment preferably further contains the scavenger of formic acid or formaldehyde. Examples of the scavenger of formic acid or formaldehyde include a compound and a polymer, a fatty acid calcium salt, a hydroxide of an alkali metal or an alkali earth metal, an inorganic acid salt, a carboxylic acid salt or an alkoxide, containing formaldehyde-reactive nitrogen.

Examples of the compound containing formaldehyde-reactive nitrogen include dicyandiamide, amino-substituted triazine, and a co-condensate of amino-substituted triazine and formaldehyde.

The content of each of the compound and the polymer, the fatty acid calcium salt, the hydroxide of an alkali metal or an alkali earth metal, the inorganic acid salt, the carboxylic acid salt or the alkoxide, containing formaldehyde-reactive nitrogen is preferably in the range of 0.01 to 1 part by mass and is more preferably 0.02 to 0.5 parts by mass per 100 parts by mass of the polyacetal resin. When each content is 0.01 to 1 part by mass, an enhancement in heat stability during a molding process of the resin composition of the present embodiment, and a reduction in the amount of formaldehyde generated from the molded article are achieved, and favorable heat aging resistance is obtained.

—Coloring Agent—

The coloring agent is not particularly limited and examples thereof include an organic pigment and an inorganic pigment. The coloring agent may be used singly or in combinations of two or more kinds thereof.

Examples of the organic pigment include a phthalocyanine-based pigment, a condensed azo-based pigment, an azo lake-based pigment, a quinacridone-based pigment, a dioxazine-based pigment, an isoindolinone-based pigment, and a condensed polycyclic pigment.

Examples of the inorganic pigment include simple oxides such as a zinc flower, titanium dioxide, rouge, chromium oxide, and iron black, sulfides such as cadmium yellow, cadmium orange, and cadmium red, chromic acid salts such as chrome yellow, zinc yellow, and chromium vermilion, ferrocyanides such as ferric hexacyanoferrate, silicates such as ultramarine, and carbon black.

The content of the coloring agent in the resin composition of the present embodiment is preferably 0.0001 to 2 parts by mass, more preferably 0.0005 to 1 part by mass per 100 parts by mass of the polyacetal resin (A). When the content of the coloring agent is in the above range, the effect of enhancing design is obtained without any reduction in mechanical strength of the molded article, and, in particular, any promotion of generation of formaldehyde in the polyacetal resin (A).

The resin composition of the present embodiment may further contain, as desired, various inorganic fillers, other thermoplastic resin, a softening agent, a crystal nucleating agent, and a release agent which are conventionally used, as long as the object of the present disclosure is not impaired.

(Method for Producing Resin Composition)

The resin composition of the present embodiment is obtained by, for example, mixing a part of each of the raw materials with melting, by use of a melt-kneading machine commonly used. Examples of the melt-kneading machine include a kneader, a roll mill, a single screw extruder, a twin screw extruder, and a multi-screw extruder.

The melt-kneading temperature can be appropriately selected based on the melting point or softening point of the polyacetal resin (A) used, and the temperature is preferably higher than the melting point or softening point of the polyacetal resin (A) by 1 to 100° C., more preferably by 10 to 60° C., further preferably by 20 to 50° C. The melting point or softening point of the polyacetal resin (A) can be determined by differential scanning calorimetry (DSC) according to JIS K7121. It is preferable for retaining quality and the working environment that the system be subjected to replacement with an inert gas and/or degassing using single-stage and multi-stage vents.

(Properties of Resin Composition)

The resin composition of the present embodiment provides a molded product which is favorable in retention stability during molding and extrusion, which is less in poor appearance, which is also less in volatilization of an organic solvent from the resin composition, which has an excellent metallic appearance, which achieves high glossiness and a high FI value, and which has a metallic appearance excellent in aesthetic properties.

The amount of formaldehyde generated, of the resin composition of the present embodiment, is preferably 5 mg/kg or less, more preferably 3 mg/kg or less.

The amount of formaldehyde generated can be measured by a method described in Examples below.

The FI value of the resin composition of the present embodiment is preferably 8 or more, more preferably 13 or more, further preferably 14 or more. The FI value serves as one index of a metallic appearance, and can be measured by a method described in Examples below.

A phenomenon of the change in lightness according to the change in angle in viewing is here referred to as a "flip-flop (F/F) phenomenon", and the value quantitatively determined for representing such a phenomenon is here referred to as a "FI (flop index) value". The FI value can be determined from the values of lightness ($L^*_{15°}$, $L^*_{45°}$ and $L^*_{110°}$) at 15 degrees, 45 degrees, and 110 degrees by use of the expression first proposed by DuPont (A. B. J. Rodriguez, JOCCA, (1992 (4)), p. 150 to 153). Specifically, the FI value is determined according to the following expression, and a higher FI value, namely, a larger difference in lightness (L*) between a highlight direction (specular direction with respect to the light incident angle) and a shade direction (non-specular direction) generally provides a higher metallic feeling.

$$FI = \frac{2.69 \times (L^*_{15°} - L^*_{110°})^{1.11}}{(L^*_{45°})^{0.85}} \qquad \text{[Expression 1]}$$

The glossiness of the resin composition of the present embodiment, immediately after injection molding, is preferably 45 or more, more preferably 60 or more, further preferably 70 or more. The glossiness can be measured by a method described in Examples below.

The glossiness serves as one index of a metallic appearance. The glossiness depends on smoothness of the surface of a molded product, and a metallic material to be molded, into which a bright material such as a metal pigment is kneaded, tends to generally exhibit a lower glossiness. A lower glossiness results in decreases in the lightness, the FI value, and the like due to the influence of scattering of light reflected on the surface of a molded article, and thus tends to result in deterioration in the quality of a metallic appearance.

(Application of Molded Product Obtained from Resin Composition)

A molded product obtained from the resin composition of the present embodiment can be used particularly in interior/exterior components provided with mechanical sections and/or sliding sections. For example, the molded product is used as any component selected from the group consisting of components provided on OA equipment, music, video or information equipment, or communication equipment, industrial components provided on office furniture or housing equipment, and interior and exterior components for automobiles. In particular, the molded product is suitably used as any component selected from the group consisting of handles, switches and bottoms demanded to have an excellent appearance. Furthermore, the molded product obtained from the resin composition of the present embodiment, when a design surface is imparted thereonto during molding with an emboss mold or by emboss processing, is preferably used as an appearance component, because the effect of improvement in appearance is exerted.

The resin composition of the present embodiment can provide a molded product which has metallic gloss without any processing such as plating or paint application onto the surface, which is excellent in heat stability and weather resistance, which retains favorable mechanical properties (for example, tensile properties and impact strength), which has high glossiness and a high FI value, and which is favorable in appearance properties. Furthermore, the molded product obtained from the resin composition according to the present embodiment has favorable appearance properties as described above, and therefore has an excellent appearance favorable in practical use even if no paint is applied. Accordingly, an appearance excellent in design is efficiently obtained without any solvent. The resin composition of the present embodiment is excellent in production stability, can be produced under a favorable working environment, and is also excellent in terms of the cost and the environment.

EXAMPLES

Hereinafter, the present disclosure will be specifically described with reference to Examples, but the present disclosure is not intended to be limited to the Examples described below.

(1) Preparation of Main Raw Material

<Polyacetal Resin (A)>

Each polyacetal resin (A) used is as follows.

(a-1) "Tenac C 4513" manufactured by Asahi Kasei Corporation (a-2) "Tenac C 4520" manufactured by Asahi Kasei Corporation (a-3) "Tenac C 7520" manufactured by Asahi Kasei Corporation <Aluminum Pigment (B)>

A ball mill having an inner diameter of 30 cm and a length of 35 cm was filled with a formulation including 250 g of an atomized aluminum powder (volume average particle size: 2.5 µm), 1.2 kg of mineral spirit, and 25 g of stearic acid, and the formulation was ground using 15 kg of glass beads having a diameter of 3 mm (specific gravity: 2.6) at 60 rpm for 10 hours.

After completion of the grinding, a slurry in the mill was washed out with mineral spirit and subjected to a 400-mesh vibration sieve, and the slurry passing through the sieve was filtered by a filter and concentrated to provide aluminum particle (b'-1) (wet aluminum particle) having a nonvolatile content of 90%.

Each of aluminum particles (b'-2) to (b'-5) different in volume average particle size and average particle thickness from one another was obtained by the same operation as described above except that the particle size and the grinding time of the atomized aluminum powder were changed.

The particle size distribution of such an aluminum particle was measured by a laser diffraction particle size distribution measuring apparatus (trade name "SALD-2300" manufactured by Shimadzu Corporation), and the volume average particle size ($D_{50}$) of the aluminum particle was determined by the 50% value of the resulting particle size distribution. The results are represented in Table 1. The measurement solvent here used was mineral spirit, and the aluminum particle serving as a sample was subjected to ultrasonic dispersion for 3 minutes as a pre-treatment.

After 1 to 2 ml of a mineral spirit solution of 5% stearic acid was added to 1 g of the resulting aluminum particle to preform preliminary dispersion (preliminary treatment), 50 ml of petroleum benzine was added and mixed, the mixture was warmed at 40 to 45° C. for 2 hours and then subjected to suction filtration by a filter, and the water surface diffusion area (WCA) of a powder formed was measured. The average particle thickness (t) was calculated from the measurement value of the WCA according to the following expression. The results are represented in Table 1.

$$t\ (\mu m) = 0.4/\text{WCA}\ (m^2/g)$$

TABLE 1

| Aluminum particle | Volume average particle size ($D_{50}$) [µm] | Average particle thickness (t) [µm] |
| --- | --- | --- |
| (b'-1) | 11 | 0.22 |
| (b'-2) | 5 | 0.16 |
| (b'-3) | 23 | 0.36 |
| (b'-4) | 10 | 0.58 |
| (b'-5) | 45 | 0.42 |

Next, the content (aluminum particle) was stirred with warming, thereafter 225 g of aluminum particle (b'-1), and 20 g of binder (d-1) described below were placed in a container that could be under reduced pressure, and the internal temperature was raised to 70° C. with stirring. The resultant was under reduced pressure in the state where the internal temperature was stable, and concentrated until the nonvolatile content reached 90%, thereby providing aluminum pigment (b-1). The mass ratio of binder (d-1) and aluminum particle (b'-1) was here 10/90.

Each of aluminum pigments (b-2) to (b-11) was obtained by the same operation as described above except that the type of the aluminum particle, the type of the binder, and the mass ratio thereof were changed as represented in Table 2.

TABLE 2

| Aluminum pigment (B) | Binder (D) selected | Aluminum particle selected | Mass ratio (binder (D)/ aluminum particle) |
| --- | --- | --- | --- |
| (b-1) | (d-1) | (b'-1) | 10/90 |
| (b-2) | (d-2) | (b'-1) | 10/90 |
| (b-3) | (d-3) | (b'-1) | 10/90 |
| (b-4) | (d-4) | (b'-1) | 10/90 |
| (b-5) | (d-5) | (b'-1) | 10/90 |
| (b-6) | (d-1) | (b'-2) | 10/90 |
| (b-7) | (d-2) | (b'-3) | 10/90 |
| (b-8) | (d-3) | (b'-4) | 10/90 |
| (b-9) | (d-5) | (b'-5) | 10/90 |

TABLE 2-continued

| Aluminum pigment (B) | Binder (D) selected | Aluminum particle selected | Mass ratio (binder (D)/ aluminum particle) |
|---|---|---|---|
| (b-10) | (d-5) | (b'-2) | 20/80 |
| (b-11) | (d-5) | (b'-3) | 35/65 |

Each binder (D) used is as follows.
(d-1) Polytetramethylene oxide (number average molecular weight: 2000) manufactured by FUJIFILM Wako Pure Chemical Corporation
(d-2) Polypropylene glycol (diol type, number average molecular weight: 2000) manufactured by FUJIFILM Wako Pure Chemical Corporation
(d-3) Polyethylene glycol (number average molecular weight: 2000) manufactured by FUJIFILM Wako Pure Chemical Corporation
(d-4) Polyethylene glycol (number average molecular weight: 1000) manufactured by FUJIFILM Wako Pure Chemical Corporation
(d-5) Polyethylene glycol (number average molecular weight: 400) manufactured by FUJIFILM Wako Pure Chemical Corporation
(d-6) "Smoil PS-260" manufactured by MORESCO Corporation <Pearl-Based Pigment (C)>
Each pearl-based pigment (C) used is as follows.
(c-1) "Twinclepearl SXB" manufactured by Nihon Koken Kogyo Co., Ltd., ($D_{50}$=15 µm), mica covered with titanium dioxide, the content of scale-like, synthetic mineral: about 67% by mass
(c-2) "Twinclepearl RYXD" manufactured by Nihon Koken Kogyo Co., Ltd., ($D_{50}$=30 µm), mica covered with titanium dioxide, the content of scale-like, synthetic mineral: about 58%
(c-3) "Pearl-Glaze MXL-100R" manufactured by Nihon Koken Kogyo Co., Ltd., ($D_{50}$=230 µm), scale-like natural product (the content of synthetic mineral: 0% by mass)
(c-4) "Twinclepearl SX" manufactured by Nihon Koken Kogyo Co., Ltd., ($D_{50}$=90 µm), mica covered with titanium dioxide, the content of scale-like, synthetic mineral: about 87%
(c-5) "Twinclepearl VXE" manufactured by Nihon Koken Kogyo Co., Ltd., ($D_{50}$=40 µm), mica covered with titanium dioxide, the content of scale-like, synthetic mineral: about 63%

The following pigment other than the above was used in Comparative Examples.
(c-6) "Tioxide RTC-30" manufactured by Huntsman Corporation, titanium oxide, crystal size: 0.21 µm, in the form of a particle <Formaldehyde Inhibitor (E)>
Each formaldehyde inhibitor (E) used is as follows.
(e-1) Sebacic acid dihydrazide manufactured by Japan Finechem Inc.
(e-2) Adipic acid dihydrazide manufactured by Japan Finechem Inc.
(e-3) Dodecanedioic acid dihydrazide manufactured by Japan Finechem Inc.

(2) Evaluation Method
<Evaluation of Mold Deposit>
Using an injection molding machine (trade name "IS-100 gN" manufactured by Toshiba Machine Co., Ltd.) in which the cylinder temperature was set to 180° C. and the mold temperature was set to 30° C., a resin composition pellet produced as described below was short-shot-molded, namely, molded under conditions where the mold was not completely filled with the resin composition, into an embossed flat-plate specimen having a thickness of 2 mm, a width of 80 mm and a length of 80 mm under injection conditions of an injection time of 60 seconds and a cooling time of 15 seconds. The mass of the specimen was adjusted so as to occupy 95% by mass of a specimen obtained by completely filling the mold with the resin composition.

The specimen was subjected to 100 shots of molding under the present conditions, and thereafter the presence of any mold deposit in the mold was observed visually and with a wiping-up waste cloth, and evaluated according to the following criteria:

Excellent: no mold deposit was visually observed, and almost no attachment onto a wiping-up waste cloth was observed.
Good: any mold deposit was visually slightly observed, and almost no attachment onto a wiping-up waste cloth was observed.
Fair: no mold deposit was visually observed, and attachment onto a wiping-up waste cloth was slightly observed.
Poor: any mold deposit was clearly observed, or attachment onto a wiping-up waste cloth was clearly observed.

<Evaluation of Contamination in Molding Machine>
After the molded piece was produced, the inside of the screw of the molding machine was purged with 3 kg of polyacetal resin (a-2). Next, the inside was again purged with 1.5 kg of "Asaclean U" manufactured by manufactured by Asahi Kasei Corporation. Thereafter, polyacetal resin (a-2) was again filled and subjected to 10 trial shots, and thereafter the molded piece was visually observed and evaluated according to the following criteria:
Good: no aluminum pigment was visually observed.
Fair: any aluminum pigment was visually slightly observed.
Poor: many aluminum pigments were visually observed.

Any case where at least any one of the mold deposit and the contamination in the molding machine was rated as "Poor" was not advanced to the next evaluation.

<FI Value>
A resin composition pellet produced as described below was molded using an injection molding machine (trade name "IS-100 gN" manufactured by Toshiba Machine Co., Ltd.) set to a cylinder temperature of 200° C. and a mold temperature of 90° C. under injection conditions of an injection time of 15 seconds and a cooling time of 20 seconds, thereby producing a specimen. The specimen was produced using a mold having a length of 90 mm, a width of 50 mm and a thickness of 2.5 mm.

The appearance of the specimen was confirmed using BYK-mac manufactured by BYK Japan K.K.

The method for measuring the FI value is described with reference to FIG. 1. FIG. 1 is a view describing a method for evaluating the FI value. The FI value was determined by first irradiating the surface of a molded product with light in a certain direction as illustrated in FIG. 1, measuring the L* values ($L^*_{15°}$, $L^*_{45°}$ and $L^*_{110°}$) (of lightness) with the light receiving angle being shifted by 15°, 45° and 110° with respect to specular light, and then assigning each of the L* values to the expression. In general, a higher FI value exhibits higher metallic texture.

<Glossiness>
The glossiness was measured at an angle of 60° on the surface of a molded article by use of the specimen used in measurement of the FI value and a glossmeter ("IG-320" manufactured by HORIBA Ltd.), according to JIS Z8741. In general, a higher glossiness is expected to impart a smoother surface of a molded article and higher followability to the surface of the mold.

<Amount of Formaldehyde Generated>

A resin composition pellet produced as described below was molded using an injection molding machine (trade name "IS-100 gN" manufactured by Toshiba Machine Co., Ltd.) set to a cylinder temperature of 180° C. and a mold temperature of 90° C. under injection conditions of an injection time of 15 seconds and a cooling time of 10 seconds, thereby producing a specimen. Next, the specimen was left to still stand in a constant-temperature bath at a room temperature of 23° C. and a humidity of 50% for 48 hours.

Next, the amount of formaldehyde released from the specimen was determined by the following method (VDA275 method). First, 50 mL of distilled water and a specimen (100 mm in length×40 mm in width×3 mm in thickness) were placed in a 500-mL polyethylene container and the container was sealed, and the resultant was heated at 60° C. for 2 hours. Thereafter, formaldehyde in the distilled water was reacted with acetylacetone in the presence of an ammonium ion. The reaction product was subjected to measurement of an absorption peak at a wavelength of 412 nm by an UV spectrometer, and thus the amount of formaldehyde released (mg/kg) was determined.

(3) Production of Resin Composition Pellet

Raw materials selected from (A), (B), (C) and (E) at a formulation ratio represented in Table 3 were placed in a polyethylene bag, and manually vigorously mixed continuously for about 10 minutes, and such an operation was repeated three times to provide a mixture. The resulting mixture was melt-kneaded (melt-mixed) by use of a twin screw extruder equipped with a 30-mm vent with being degassed through the vent, under conditions of a set temperature of 200° C., a rotation speed of 80 rpm and an amount of discharge of 12 kg/hour, and dried at 80° C. for 3 hours, thereby producing a resin composition pellet. A resin composition pellet in Comparative Example 3 was produced in the same manner as described above except that aluminum particle (b'-1) and also binder (d-3), instead of raw materials (A), (C) and (E) and aluminum pigment (B), were placed in a polyethylene bag.

The resin composition pellet was used to perform various evaluations described above. The results are represented in Table 3.

The amount of the aluminum particle added, included in the aluminum pigment (B), was described in the column "Aluminum pigment (B)" in Table 3.

TABLE 3

| | | (A) Polyacetal resin | | (B) Aluminum pigment | | (C) Pearl-based pigment | | (E) Formaldehyde inhibitor | |
|---|---|---|---|---|---|---|---|---|---|
| | | Type | Amount added (parts by mass) | Type | Amount of aluminum particle added (parts by mass) | Type | Amount added (parts by mass) | Type | Amount added (parts by mass) |
| Example | 1 | (a-1) | 100 | (b-1) | 6.0 | (c-1) | 0.5 | (e-1) | 0.7 |
| | 2 | (a-1) | 100 | (b-4) | 6.0 | (c-1) | 0.5 | — | — |
| | 3 | (a-2) | 100 | (b-5) | 6.0 | (c-1) | 0.5 | (e-2) | 0.7 |
| | 4 | (a-2) | 100 | (b-7) | 6.0 | (c-1) | 0.5 | — | — |
| | 5 | (a-1) | 100 | (b-10) | 4.0 | (c-1) | 0.5 | (e-3) | 0.7 |
| | 6 | (a-3) | 100 | (b-11) | 6.0 | (c-1) | 0.5 | — | — |
| | 7 | (a-3) | 100 | (b-9) | 6.0 | (c-4) | 0.5 | (e-1) | 0.7 |
| | 8 | (a-3) | 100 | (b-2) | 6.0 | (c-2) | 0.7 | — | — |
| | 9 | (a-1) | 100 | (b-8) | 8.0 | (c-1) | 0.5 | (e-2) | 0.7 |
| | 10 | (a-1) | 100 | (b-5) | 10.0 | (c-3) | 0.5 | (e-1) | 0.7 |
| | 11 | (a-2) | 100 | (b-6) | 6.0 | (c-2) | 1.0 | — | — |
| | 12 | (a-2) | 100 | (b-7) | 6.0 | (c-5) | 0.7 | (e-3) | 0.7 |
| | 13 | (a-3) | 100 | (b-3) | 6.0 | (c-3) | 0.5 | — | — |
| | 14 | (a-1) | 100 | (b-3) | 6.0 | (c-4) | 0.5 | (e-1) | 0.7 |
| | 15 | (a-3) | 100 | (b-4) | 2.0 | (c-1) | 0.5 | (e-1) | 0.7 |
| | 16 | (a-1) | 100 | (b-4) | 4.0 | (c-1) | 0.5 | — | — |
| | 17 | (a-1) | 100 | (b-4) | 10.0 | (c-1) | 0.5 | — | — |
| Comparative Example | 1 | (a-1) | 100 | (b-1) | 6.0 | — | — | — | — |
| | 2 | (a-1) | 100 | (b-1) | 18.0 | (c-1) | 1.0 | — | — |
| | 3 | (a-1) | 100 | (b'-1) | 6.0 | (c-1) | 0.50 | (e-1) | 0.7 |
| | 4 | (a-1) | 100 | (b-1) | 6.0 | (c-6) | 0.50 | — | — |

| | | Evaluation of mold deposit | Evaluation of contamination in molding machine | Amount of formaldehyde generated (mg/kg) | FI value | Glossiness |
|---|---|---|---|---|---|---|
| Example | 1 | Excellent | Good | 0.4 | 16.9 | 86.9 |
| | 2 | Good | Fair | 2.8 | 16.9 | 68.2 |
| | 3 | Good | Good | 0.4 | 17.0 | 50.1 |
| | 4 | Good | Good | 2.2 | 15.9 | 84.1 |
| | 5 | Fair | Good | 0.4 | 17.1 | 49.5 |
| | 6 | Fair | Good | 1.2 | 15.6 | 52.5 |
| | 7 | Good | Good | 0.4 | 9.2 | 53.5 |
| | 8 | Good | Good | 1.4 | 17.0 | 84.1 |
| | 9 | Fair | Fair | 0.4 | 16.8 | 55.1 |
| | 10 | Good | Good | 0.4 | 8.4 | 48.9 |
| | 11 | Good | Good | 2.8 | 17.9 | 85.5 |

TABLE 3-continued

|             |    |           |      |     |      |      |
|-------------|----|-----------|------|-----|------|------|
|             | 12 | Good      | Good | 0.4 | 15.2 | 84.6 |
|             | 13 | Good      | Good | 1.6 | 13.6 | 70.2 |
|             | 14 | Good      | Good | 0.4 | 15.8 | 71.2 |
|             | 15 | Excellent | Good | 0.4 | 14.6 | 74.2 |
|             | 16 | Good      | Fair | 2.4 | 16.3 | 84.5 |
|             | 17 | Fair      | Fair | 2.8 | 18.1 | 84.1 |
| Comparative | 1  | Poor      | Good | —   | —    | —    |
| Example     | 2  | Poor      | Poor | —   | —    | —    |
|             | 3  | Good      | Poor | —   | —    | —    |
|             | 4  | Fair      | Good | 9.8 | 8.6  | 73.5 |

The following was found from Table 3. Neither any clear mold deposit nor any contamination in the molding machine was observed in Examples 1 to 17 according to the present disclosure. Not only the amount of formaldehyde generated was small, but also excellent results with respect to the glossiness and the FI value were obtained. It was also found from such Examples that a pearl-based pigment (C) having a smaller volume average particle size ($D_{50}$) (for example, 200 μm or less) was used to result in a more enhanced FI value. It was further found from such Examples that an aluminum particle having a smaller volume average particle size ($D_{50}$) (for example, 40 μm or less) was used to result in a more enhanced FI value.

In Examples 5 and 6, while no problems about properties were caused, vent-up was observed in extruding and remarkably observed particularly in Example 6.

On the contrary, any clear mold deposit was observed in Comparative Example 1. The reason for this was considered because no pearl-based pigment (C) was used.

In Comparative Example 2, not only any clear mold deposit was confirmed, but also the aluminum particle was transferred to hands when the hands were touched to the resin composition pellet. The reason for this was considered because the content of the aluminum particle was excessive.

In Comparative Example 3, clear contamination in the molding machine was confirmed. The reason for this was considered because the aluminum particle was used instead of the aluminum pigment (B).

As clear from the evaluation results in Table 3, specified aluminum pigment and pearl-based pigment were added to thereby provide a resin composition which could allow for production of a molded product causing less generation of formaldehyde and having an excellent metallic appearance, and furthermore which could allow for suppression of contamination by the aluminum pigment in a mold and a molding machine during molding, according to each of Examples 1 to 17.

INDUSTRIAL APPLICABILITY

The resin composition of the present disclosure has industrial applicability as, for example, a material of a member for design components.

The invention claimed is:

1. A resin composition comprising a polyacetal resin (A), an aluminum pigment (B), and a pearl-based pigment (C), wherein
    the aluminum pigment (B) comprises an aluminum particle and another component,
    the aluminum particle has a volume average particle size ($D_{50}$) of 3 to 100 μm and a content thereof is 0.01 to 15 parts by mass per 100 parts by mass of the polyacetal resin (A) and
    the aluminum pigment (B) comprises the aluminum particle and a binder (D), and a mass ratio (binder (D)/ aluminum particle) of the binder (D) to the aluminum particle is in the range of 5/95 to 30/70.

2. The resin composition according to claim 1, comprising the aluminum pigment (B) in an amount of more than 1 part by mass and 15 parts by mass or less per 100 parts by mass of the polyacetal resin (A).

3. The resin composition according to claim 1, comprising the pearl-based pigment (C) in an amount of 0.01 to 10 parts by mass per 100 parts by mass of the polyacetal resin (A).

4. The resin composition according to claim 1, wherein the pearl-based pigment (C) has a volume average particle size ($D_{50}$) of 1 to 300 μm.

5. The resin composition according to claim 1, wherein the pearl-based pigment (C) comprises 40% by mass or more of a synthetic mineral.

6. The resin composition according to claim 1, wherein the pearl-based pigment (C) is mica covered with titanium dioxide or iron oxide.

7. The resin composition according to claim 1, wherein the binder (D) is at least one selected from liquid paraffin and polyalkylene glycol.

8. The resin composition according to claim 2, comprising the pearl-based pigment (C) in an amount of 0.01 to 10 parts by mass per 100 parts by mass of the polyacetal resin (A).

9. The resin composition according to claim 2, wherein the pearl-based pigment (C) has a volume average particle size ($D_{50}$) of 1 to 300 μm.

10. The resin composition according to claim 2, wherein the pearl-based pigment (C) comprises 40% by mass or more of a synthetic mineral.

11. The resin composition according to claim 2, wherein the pearl-based pigment (C) is mica covered with titanium dioxide or iron oxide.

12. The resin composition according to claim 2, wherein the binder (D) is at least one selected from liquid paraffin and polyalkylene glycol.

13. The resin composition according to claim 3, wherein the pearl-based pigment (C) has a volume average particle size ($D_{50}$) of 1 to 300 μm.

14. The resin composition according to claim 3, wherein the pearl-based pigment (C) comprises 40% by mass or more of a synthetic mineral.

15. The resin composition according to claim 3, wherein the pearl-based pigment (C) is mica covered with titanium dioxide or iron oxide.

16. The resin composition according to claim 3, wherein the binder (D) is at least one selected from liquid paraffin and polyalkylene glycol.

17. The resin composition according to claim 4, wherein the pearl-based pigment (C) comprises 40% by mass or more of a synthetic mineral.

* * * * *